United States Patent
Anvari

(10) Patent No.: US 10,542,508 B2
(45) Date of Patent: *Jan. 21, 2020

(54) WIRELESS RADIO ACCESS NETWORKS WITH ASYNCHRONOUS FRONTEND

(71) Applicant: Kiomars Anvari, Walnut Creek, CA (US)

(72) Inventor: Kiomars Anvari, Walnut Creek, CA (US)

(73) Assignee: Kiomarss Anvari, Walnut Creek, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/109,700

(22) Filed: Aug. 22, 2018

(65) Prior Publication Data

US 2018/0368091 A1    Dec. 20, 2018

Related U.S. Application Data

(63) Continuation of application No. 15/145,536, filed on May 3, 2016, now Pat. No. 10,064,149.

(51) Int. Cl.
*H04W 56/00* (2009.01)
*H04L 29/08* (2006.01)

(52) U.S. Cl.
CPC ......... *H04W 56/0015* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2009/0122745 A1* | 5/2009 | Fahldieck | ........... | H04W 88/085 370/315 |
| 2010/0265834 A1* | 10/2010 | Michaelis | ............... | H04L 47/10 370/252 |
| 2011/0170577 A1* | 7/2011 | Anvari | ....................... | H04L 5/16 375/219 |
| 2013/0129025 A1* | 5/2013 | Dyson | ................... | H04W 28/14 375/371 |
| 2014/0219255 A1* | 8/2014 | Eyuboglu | ............. | H04W 72/12 370/336 |
| 2015/0189692 A1* | 7/2015 | Portolan | ............... | H04J 3/0661 370/338 |
| 2016/0205589 A1* | 7/2016 | Lorenz | ................... | H04L 12/413 370/458 |
| 2016/0323067 A1* | 11/2016 | Jana | ....................... | H04L 1/1607 |
| 2017/0272513 A1* | 9/2017 | Arrington | ............. | H04L 65/605 |
| 2017/0311183 A1* | 10/2017 | Cotanis | .................. | H04W 28/16 |

OTHER PUBLICATIONS

U.S. Appl. No. 62/057,814, Cotanis, May 30, 2014 (Year: 2014).*

* cited by examiner

*Primary Examiner* — Brandon M Renner
*Assistant Examiner* — Jay L Vogel

(57) ABSTRACT

A synchronization technique for cloud radio access network (cloud RAN) to synchronize the cloud and remote radio units. The connection between cloud and remote radios is Ethernet and IEEE1588 is used to provide synchronization between baseband residing in the cloud and remote radios.

8 Claims, 5 Drawing Sheets

WIRELESS RADIO ACCESS NETWORKS WITH ASYNCHRONOUS FRONTEND

The application claims priority to the following related application and included here is as a reference.
Nonprovisional application: U.S. patent application Ser. No. 15/145,536 filed May 3, 2016, and entitled "CLOUD BASED WIRELESS NETWORK."

BACKGROUND

Mobile data is increasing at a compound annual rate of far more than 100% as a result of an increasing level of penetration of data-intensive devices and an increasing level of usage per device. These devices are getting smarter due to improved user interfaces, vastly increased numbers of applications, faster processors, and improved radio access technologies, therefore are consuming increasing amounts of data.

Data volumes are growing at a rate that exceeds operators' ability to grow capacity. Capacity growth typically comes from growth in the number of sites, from increased spectrum resources, and from enhancements in radio access technology.

Long Term Evolution (LTE) technology, standardized by the Third Generation Partnership Project (3GPP), has emerged as the next generation wireless technology that will lead the growth of mobile broadband services in the next decade. Its adoption by service providers around the world has the potential to generate economies of scale unprecedented by any previous generation of wireless networking technology as it becomes the universal 4G/5G mobile platform used by all service providers.

LTE is critical to delivering the lower cost per bit, higher bandwidth, and subscriber experience needed to address the challenges of mobile broadband. It has the potential to transform how subscribers and machines use applications and content distributed over mobile and converged networks. The effect will be to increase the value of these networks and create favorable conditions for the continued mass market adoption of mobile broadband services.

The reality is that, we have reached a point where an increase in number of conventional sites and available spectrum can no longer keep up with the explosion in demand for mobile data capacity—actually falling short by an entire order of magnitude in recent years. What other options exist? One possibility is architectural innovation. What if the definition of a "cell site" were radically changed, in such a way that the number of "sites" dramatically increased and the cost per unit of capacity (after adjusting for the inevitable lower utilization of smaller sites) significantly decreased?

This capacity gap drives deployment of at least one order-of-magnitude more "small cells"—making up for the difference by means of spectrum re-use. In order to provide consistent capacity density across a mobile service area, these deployments need to take place in a more "distributed" manner—forcing operators to expand beyond the current foot-print for the deployment of more mobile broadband radios. In many cases, operators need to acquire more and new types of cell locations to deploy data-centric wireless broadband service networks. These cell locations then determine the required type of "small cell" equipment to build a heterogeneous mobile radio access network.

Operators believe Spectrum and radio access network are the most expensive components. OEM describes an uneven distribution of traffic. They also indicate that "50% of traffic is carried by 15% to 20% of the cells." Small and low cost cells can support an exceptionally high traffic density. According to a published study LTE small cells are able to deliver as high as 200 times the traffic density of LTE macrocells. Therefore, a new and more varied radio access network (RAN) architecture is emerging, driven by the availability of new technologies, more demanding performance, coverage and cost requirements, and innovative business models. The traditional ground-based multi-sector macro base transceiver station (BTS) is rapidly being complemented by single-sector cells with a smaller footprint.

Time division duplex (TDD) technology has gained much attention since TDD can be adaptively adjusted to handle asymmetric and time-varying traffic. A major disadvantage of dynamic TDD (D-TDD) is severe co-channel interference (CCI) due to uplink and downlink asymmetric transmission. The interference problem can be alleviated via using smart antennas. Intelligent time slot allocation and scheduling algorithms can also improve the performance of D-TDD systems.

In next decade, Web-scale IT will be an architectural approach found operating in most of global enterprises, up from less than 10 percent in 2013. Web-scale IT is a pattern of global-class computing that delivers the capabilities of large cloud service providers within an enterprise IT setting by rethinking positions across several dimensions.

Large cloud services providers such as Amazon, Google, Facebook, etc., are reinventing the way in which IT services can be delivered. Their capabilities go beyond scale in terms of sheer size to also include scale as it pertains to speed and agility. If enterprises want to keep pace, then they need to emulate the architectures, processes and practices of these exemplary cloud providers.

Web-scale IT looks to change the IT value chain in a systemic fashion. Data centers are designed with an industrial engineering perspective that looks for every opportunity to reduce cost and waste. Web-oriented architectures allow developers to build very flexible and resilient systems that recover from failure more quickly.

Web-scale IT refer to a global-class of computing or architectural approach used to deliver the capabilities of large cloud service providers within an enterprise IT setting. The approach is to design, build and manage data center infrastructure where capabilities go beyond scale in terms of size to include scale as it pertains to speed and agility. Web-scale IT is simply defined as all the things happening at large cloud service firms, such as Google, Amazon, Netflix, Facebook and others, that enables them to achieve extreme levels of agility and scalability by applying new processes and architectures Web-scale IT methodology pertains to designing, deploying and managing infrastructure at any scale and can be packaged in a number of ways to suit diverse requirements and can scale to any size of business or enterprise. It is not a single technology implementation, but rather a set of capabilities of an overall IT system This disclosure is a synchronization technique in a cloud radio access network (RAN) using IEEE1588.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
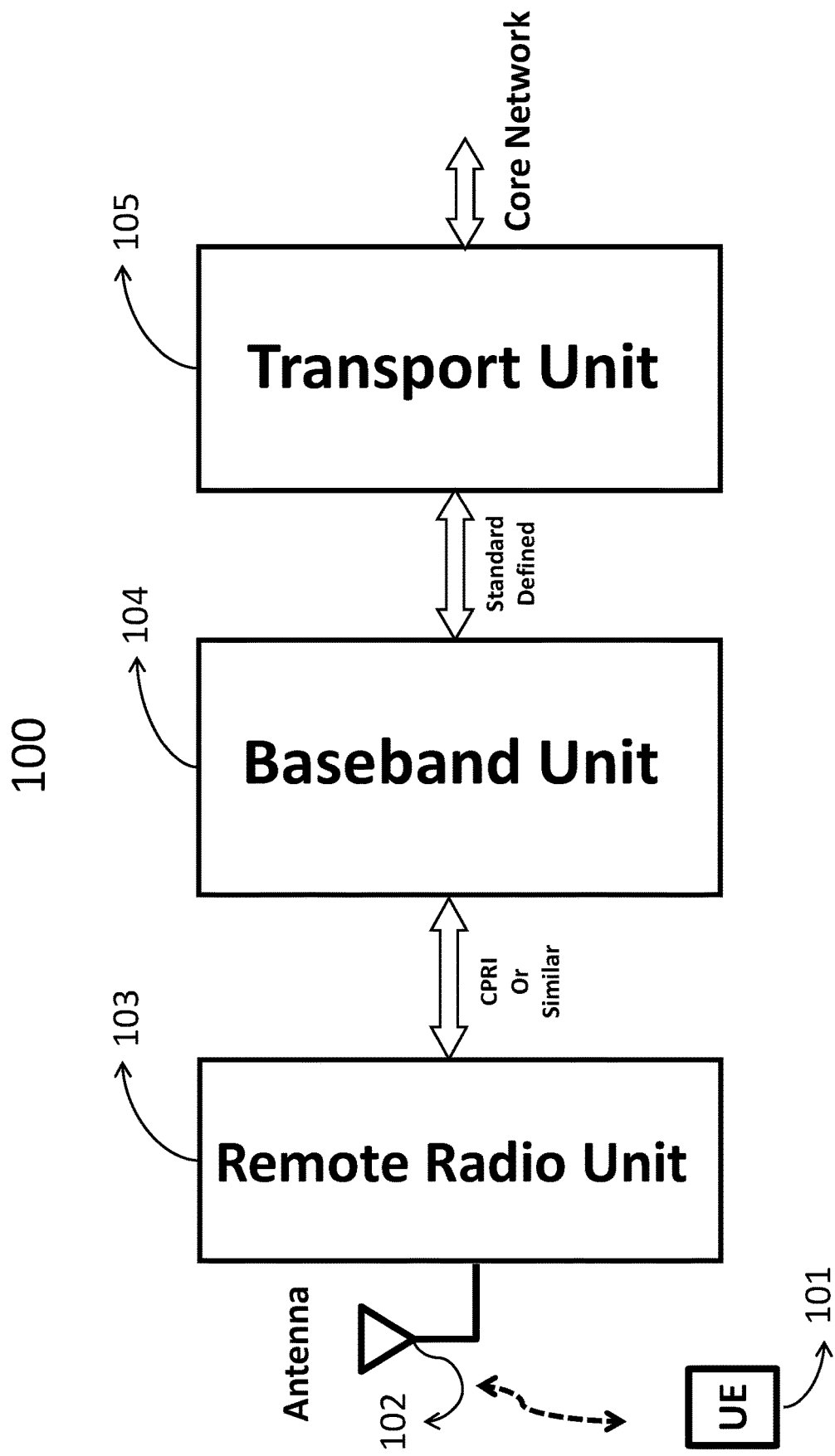
FIG. 1 illustrates an embodiment of a conventional Radio Access Network (RAN).

FIG. 1 depicts an embodiment of a conventional radio access network (RAN) 100. In general, conventional RAN 100 facilitates communication between user equipment (UE) and core network. Signal sent by UE 101 is received by antenna 102 and translated to baseband signal by remote radio unit 103. The baseband signal from remote radio unit 103 is sent through a synchronous link using common protocol for radio interface (CPRI) or other similar synchronous protocols to baseband unit 104 for detection. The detected signal from baseband unit 104 is transported to core network by transport unit 105.

Figure 2:
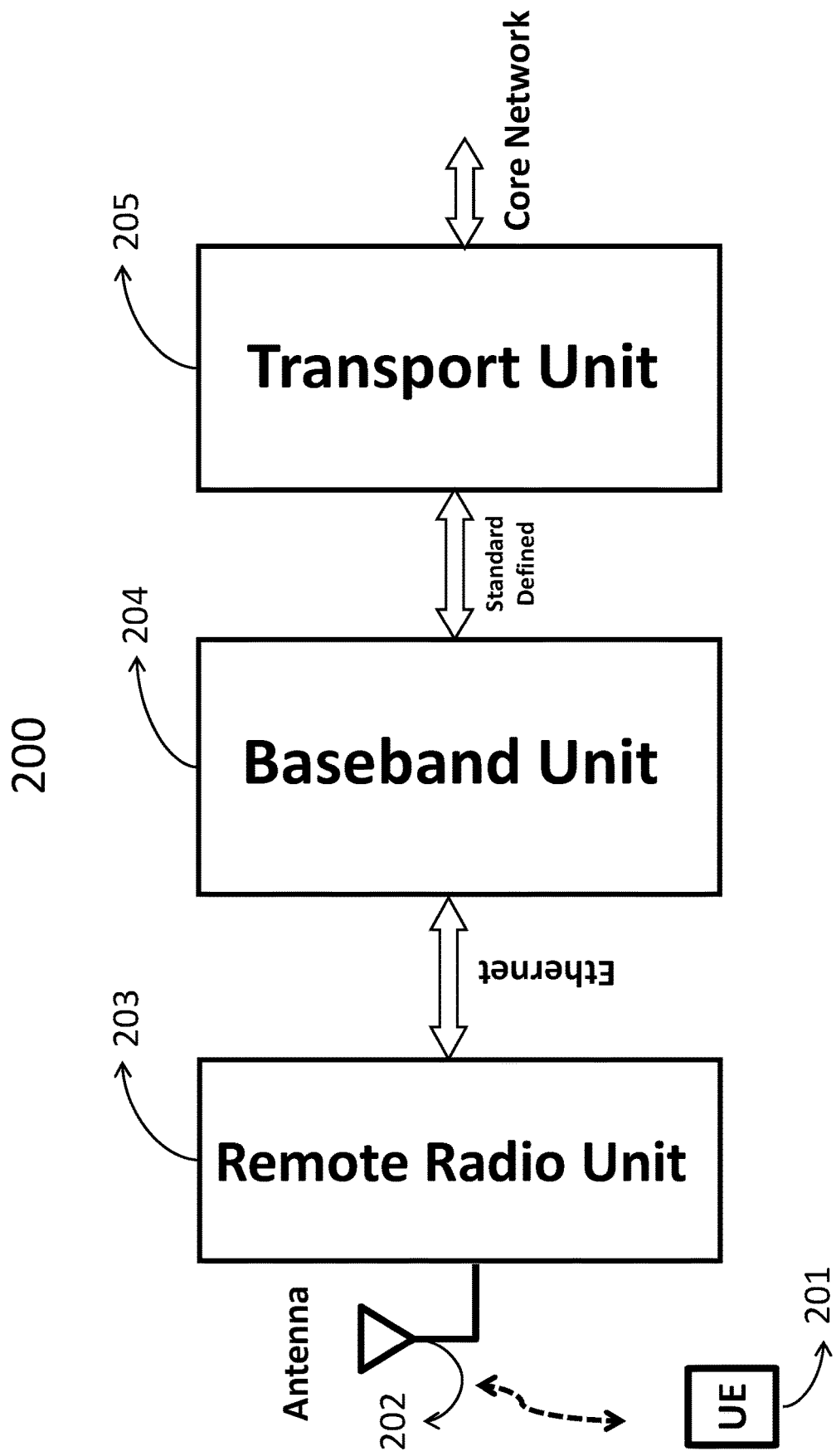
FIG. 2 illustrates embodiments of a packet based Radio Access Network (RAN).

FIG. 2 depicts one embodiment of an all packet radio access network (RAN) 200. In general, all packet RAN 200 facilitates communication between user equipment (UE) and core network. Signal sent by UE 201 is received by antenna 202 and translated to baseband signal by remote radio unit 203. The baseband signal from remote radio unit 203 is sent through an asynchronous link to baseband unit 204 in the cloud. The detected signal from baseband unit 204 is transported to core network by transport unit 205.

In one embodiment the link between remote radio unit 203 and baseband unit 204 is Ethernet.

In one embodiment the link between remote radio unit 203 and baseband unit 204 is serial rapid IO (SRio).

In one embodiment the link between remote radio unit 203 and baseband unit 204 is any proprietary packet protocol.

In one embodiment the asynchronous link between remote radio unit 203 and the baseband unit 204 exchange IP packets containing baseband signal and control signals.

In one embodiment the IP packets (TCP and UDP) in asynchronous link between baseband unit 204 and remote radio unit 203 have CPRI, open base station architecture initiative (OBSAI) or other synchronous protocols encapsulated.

In one embodiment the Ethernet packets between remote radio unit 203 and baseband unit 204 have baseband signal and control data encapsulated.

In one embodiment the Ethernet packets between remote radio unit 203 and baseband unit 204 have CPRI, OBSAI or other synchronous protocols encapsulated.

In one embodiment the asynchronous link between remote radio unit 203 and the baseband unit 204 uses header and payload compression.

Figure 3:
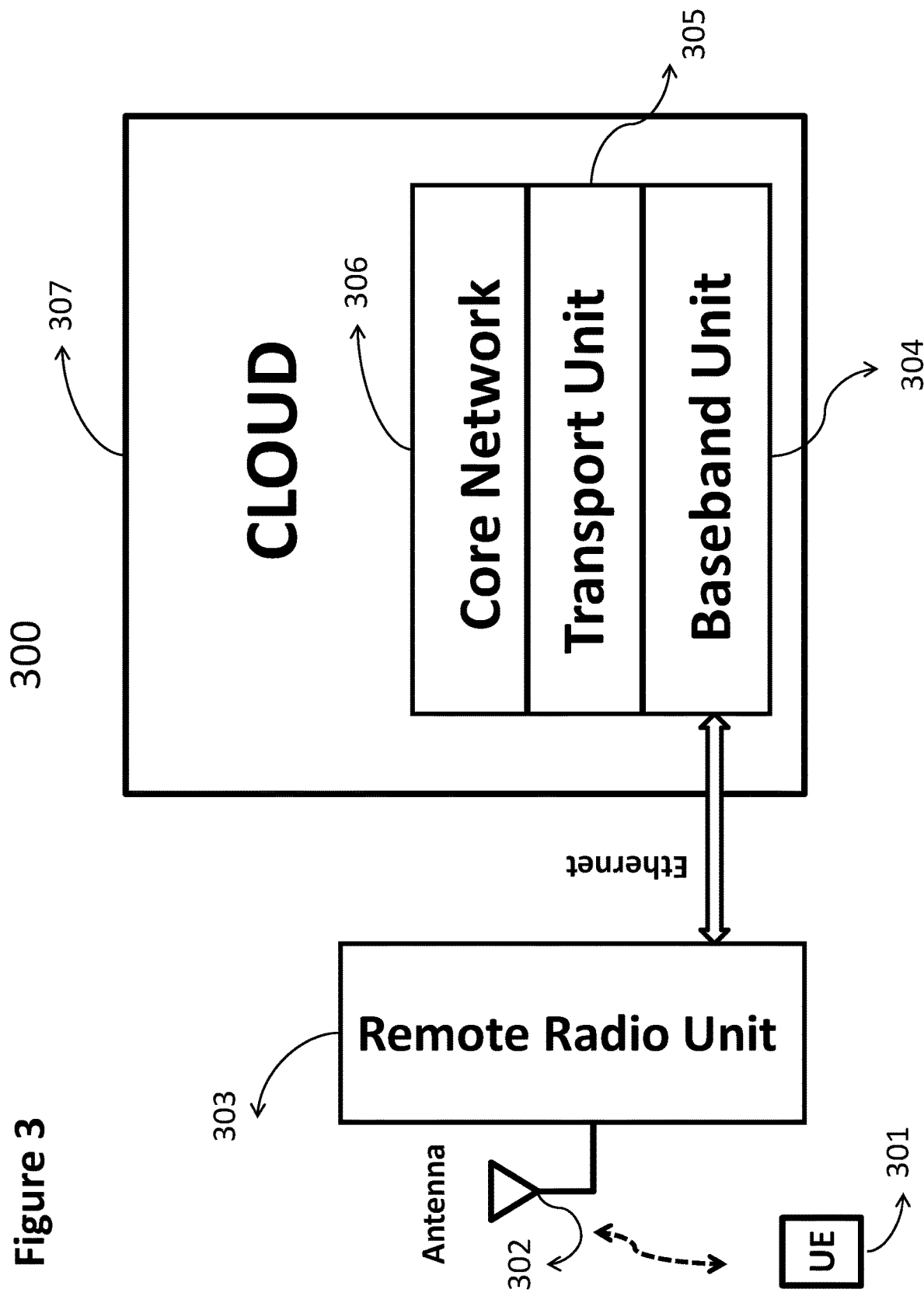
FIG. 3 depicts embodiments of a Cloud RAN.

FIG. 3 illustrates an embodiment of cloud RAN 300. In general, cloud RAN 300 facilitates communication between user equipment (UE) 301 and cloud 307. Signal sent by UE 301 is received by antenna 302 and translated to baseband signal by remote radio unit 303. The baseband signal from radio unit 303 is sent through an asynchronous link to the cloud 307 that accommodates baseband unit 304, transport unit 305 and core network 306 for further processing. The detected signal from baseband unit 304 is transported to core network 306 by transport unit 305.

In one embodiment of cloud RAN 300, the Ethernet protocol packets or any proprietary protocol packets between remote radio unit 303 and cloud 307 encapsulate baseband signal, control signal, and timing signal.

In one embodiment of cloud RAN 300, the Ethernet packets between remote radio unit 303 and cloud 307 carry CPRI or other similar protocols that contain control data and baseband data.

Figure 4:
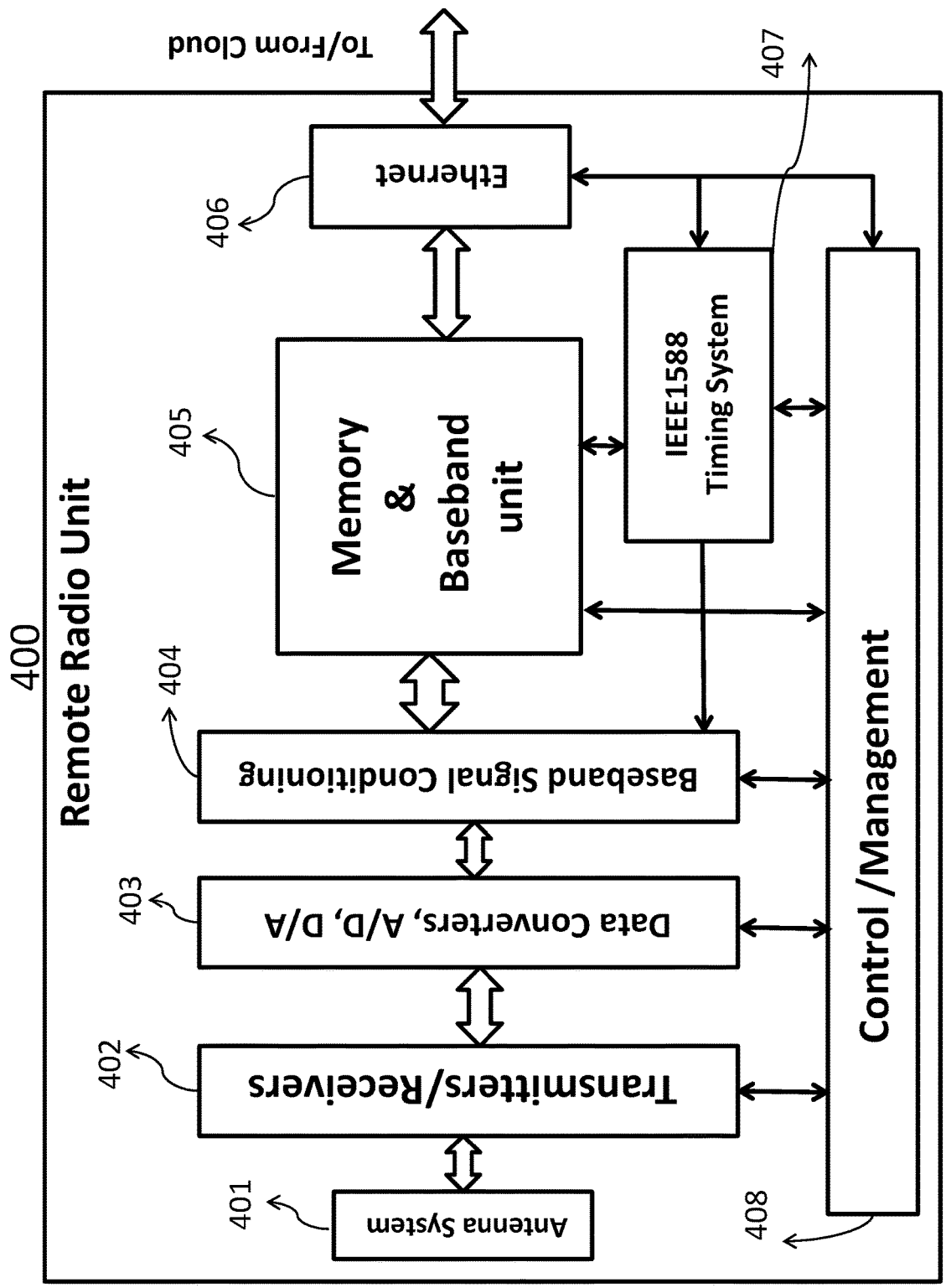
FIG. 4 shows an embodiment of Radio Head in a Cloud RAN.

FIG. 4 illustrates the architecture of remote radio unit 400 within a cloud RAN. Remote radio unit 400 facilitates translation of signal from analog waves received from antenna system 401 to digital baseband for transmission to the cloud using an asynchronous link between remote radio unit and the cloud. It also translates the digital baseband signal received from cloud through asynchronous link to analog waves to be transmitted by antenna system 401.

Remote radio unit 400 includes, among other things, antenna system 401, transmitters and receivers 402, data converters 403, baseband signal conditioning 404, memory/baseband unit 405, Ethernet port 406, IEE1588 timing system 407, and control/management 408.

In one embodiment, the antenna system 401 comprises multiple antennas to support diversity, MIMO and multi-point operation. It also could provide filtering, power amplification and low noise amplification.

The receivers/transmitters unit 402 perform the task of down conversion of radio frequency signals received from antenna system 401 to baseband or low IF signals and up converting the baseband and IF signals to radio frequency signals for antenna system 401 to transmit.

The data converter 403 does the task of analog to digital and digital to analog conversion. Data converter 403 inputs and outputs are baseband sample streams.

The baseband sample streams from/to data converter 403 are conditioned in baseband signal conditioning 404.

The baseband signal conditioning 404 can perform AGC, crest factor reduction (CFR), digital pre-distortion (DPD), equalization, beam forming and other baseband signal conditioning.

In one embodiment of remote radio unit 400, the baseband signals received from cloud through asynchronous link are first stored in a memory/baseband unit block 405 based on their transmitted time stamp or sequence number before being formatted, processed and sent to signal conditioning 404 and converter 403 for transmission.

In one embodiment, the memory size of the memory/baseband unit block 405 is far more than the maximum delay jitter of Ethernet packets, SRio packets, and proprietary packets received from the cloud.

In one embodiment of the remote radio unit 400, the Ethernet packets payloads and proprietary packets payloads received from cloud through asynchronous link have a remote radio identifier field, are time stamped, and have a sequence number.

In one embodiment, the Ethernet packet's payload is stored in the memory of memory/baseband unit block 405 based on their time stamp and sequence number to avoid any early and late Ethernet packets.

In one embodiment, the memory/baseband unit block 405 uses the timing and control information obtained from IEEE1588 timing system block 407 and control/management block 408 to process various baseband signal streams for baseband conditioning block 404.

The formatting and processing of the baseband signal in memory/baseband unit block 405 can be controlled by control/management block 408.

In one embodiment, the baseband signal exchange between the baseband unit in the RRU and the baseband unit in the cloud or centralized baseband unit is baseband frames.

In one embodiment, the memory/baseband unit block 405 uses the timing and control information obtained from IEEE1588 timing system block 407 and control/management block 408 to format, process, time stamp, number, and tag various baseband signal streams received from baseband unit 405 for transmission to the cloud or a centralized baseband unit through Ethernet port 406.

In one embodiment the Ethernet packets received from cloud or any nodes in the path between cloud and remote radio 400 carry IEEE1588 timing information.

The Ethernet block 406 provides the physical layer for the remote radio unit 400 Ethernet port.

In one embodiment, the Ethernet block 406 identifies the IEEE1588 timing packets, control/management packets, and baseband signal packets received from cloud and send them to IEEE1588 timing system block 407, control/management block 408, and memory/baseband unit block 405.

In one embodiment, the Ethernet block 406 receives the IEEE1588 timing packets, control/management packets, and baseband signal packets from IEEE1588 timing system block 407, control/management block 408, and memory/baseband unit block 405 and sends them to the cloud.

In one embodiment, the IEEE1588 timing system block 407 receives the timing packets from Ethernet block 406 and retrieve synchronization and time of the day information.

In one embodiment, the IEEE1588 timing system 407 through the Ethernet block 406 communicates and exchange timing packets with an independent node in the transport network to obtain and maintain clock synchronization and time of the day.

In one embodiment, the IEEE1588 timing system block 407 uses the clock synchronization information to create clocks and reference frequencies for the entire remote radio unit 400.

In one embodiment, the IEEE1588 timing system block 407 shares time of the day information with control/management block 408 and memory/baseband unit block 405.

In one embodiment, the IEEE1588 timing block 407 can use SYNCE or other synchronization techniques (assisted GPS, NTP, etc.) for synchronizing remote radio unit 400.

In another embodiment the baseband signal packets received from the cloud or centralized baseband unit are stored in the memory/baseband unit 405 based on their time stamp and then are formatted and processed.

In another embodiment the baseband signal packets received from the cloud or centralized baseband unit are stored in the memory/baseband unit 405 based on their sequence number and then are formatted and processed.

The control/management block 408 performs control and management of the remote radio unit 400.

In one embodiment, the control/management block 408 helps to initialize all the blocks in remote radio unit 400 at power up or reset.

In one embodiment, the control/management block 408 monitors the remote radio unit 400 for any alarm or malfunction and report the collected information to cloud.

In one embodiment, the control/management block 408 based on control data received from cloud configures memory/baseband unit 405 to perform specific formatting and baseband processing compliment to the baseband processing in the cloud.

In one embodiment, the control/management block 408 based on control data received from the cloud configures the function of memory/baseband unit 405 which is complement to the function of baseband unit in the cloud in real time.

In one embodiment the control/management block 408 configures the operating frequency RRU, bandwidth of RRU and functions of memory/baseband unit 405 to complement the functions of baseband unit in the cloud.

In one embodiment the control/management block 408 in real time configures the operating frequency RRU, bandwidth of RRU and functions of memory/baseband unit 405 to complement the functions of baseband unit in the cloud.

In another embodiment the real time configuration of memory/baseband unit 405 is based on the traffic load or other reasons (such as interference, performance, power consumption, and etc.) identified in the cloud.

In another embodiment the configuration of memory/baseband unit 405 is based on initial configuration defined in the cloud.

In another embodiment the initial configuration of memory/baseband unit 405 that is defined by the cloud does not change and depends on the initial network configuration.

In one embodiment the control signals from the cloud have time stamp or sequence number.

In one embodiment, the control/management block 408 works as part of cloud RAN Self Organizing Network (SON) and carry out tasks required by SON.

In one embodiment the RRU is an internet of things (IoT).

Figure 5:
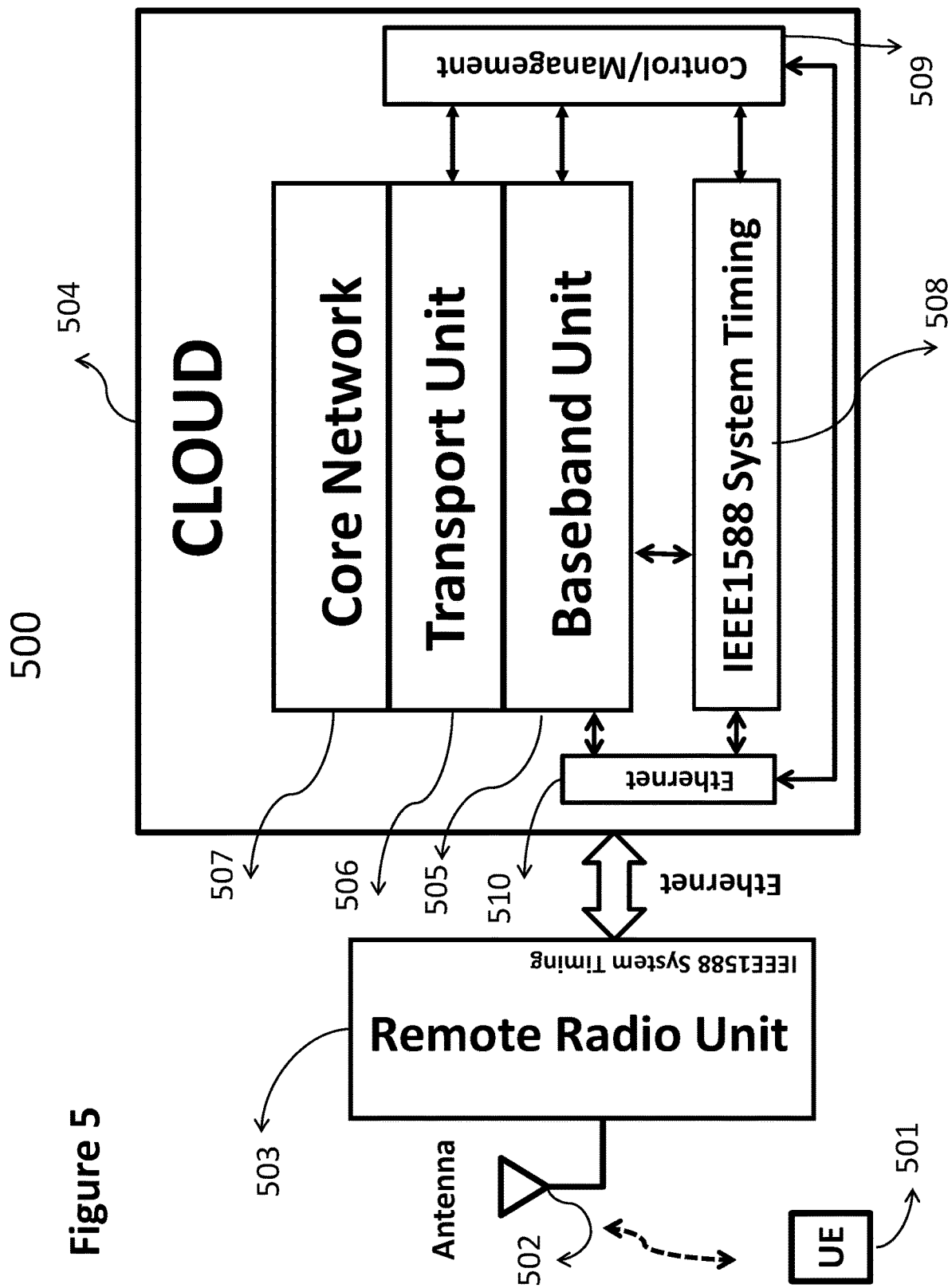
FIG. 5 shows an embodiment of Cloud RAN components in a Cloud.

FIG. 5 illustrates an embodiment of cloud RAN 500. In general, cloud RAN 500 facilitates communication between user equipment (UE) 501 and core network 507. Signal sent by UE 501 is received by antenna 502 and translated to baseband signal by remote radio unit 503. The baseband signal from remote radio unit 503 with IEEE1588 timing is sent through asynchronous link to the cloud 504 that accommodates baseband unit 505, transport unit 506, core network 507, IEEE1588 system timing 508, control/management 509 and Ethernet port 510. The information from baseband unit 505 is transported to core network 507 by transport unit 506.

In one embodiment, the cloud RAN 500 uses IEEE1588 to synchronize the cloud 504 with the network.

In one embodiment, the cloud RAN 500 uses IEEE1588 to synchronize the cloud 504 with remote radio unit 503.

In one embodiment of the cloud RAN 500, the Ethernet packets received by cloud 504 from remote radios (remote radio 503 being one of them) through asynchronous link have a remote radio identifier and are time stamped, have a sequence number or both.

In one embodiment of the cloud RAN 500, the Ethernet encapsulates the information signal, the control signal, and the synchronization signal.

In one embodiment of the cloud RAN 500, the encapsulated information signal is the baseband frames.

In one embodiment of the cloud RAN 500, the information signal received from RRU have time stamp or sequence number and are stored based on the order of their transmission time and sequence number.

In one embodiment of the cloud RAN 500, the control signals from RRU have time stamp or sequence number.

In one embodiment, the baseband unit 505 uses memory blocks to store the baseband signal received from remote radios (remote radio 503 being one of them) based on their identifier, time tag or sequence number to avoid any early and late Ethernet packets.

In one embodiment the remote radio unit is an IoT (internet of things)

In one embodiment the remote radio unit (RRU) uses an IP address as an identifier.

In one embodiment, the memory size of the baseband unit block 505 is far more than the maximum delay jitter of Ethernet packets received from the remote radios (remote radio 503 being one of them).

In one embodiment the baseband unit 505 stores the received baseband signal from remote radio unit (RRU) based on their time stamp and then format and process them.

In one embodiment the baseband unit 505 stores the received baseband signal from remote radio unit (RRU) based on their sequence number and then format and process them.

In one embodiment, the baseband unit 505 uses the timing and control information obtained from IEEE1588 system timing block 508 and control/management block 509 to format received baseband signal streams for processing.

In one embodiment, baseband unit 505 processes the received baseband signal to provide information data for transport layer 506.

In one embodiment, the baseband unit 505 uses the timing and control information obtained from IEEE1588 system timing block 508 and control/management block 509 to format, time stamp, number and tag various baseband signal streams for transmission to remote radios (remote radio 503 being one of them).

The Ethernet block 510 provides the physical layer for the cloud 504 Ethernet port.

In one embodiment, the Ethernet block 510 identifies the IEEE1588 timing packets, control/management packets, and baseband signal frames or packets and sends them to IEEE1588 system timing block 508, control/management block 509, and baseband unit 505.

In one embodiment, the Ethernet block 508 receives the IEEE1588 timing packets, control/management packets, and baseband signal frame or packets from IEEE1588 system timing block 508, control/management block 509, and baseband unit 505 and sends them to remote radios (remote radio 503 being one of them).

In one embodiment, the IEEE1588 system timing block 508 receives the timing packets from Ethernet block 510 and retrieve synchronization and time of the day information.

In one embodiment, the IEEE1588 system timing block 508 through the Ethernet block 510 communicates and exchange timing packets with another node in the network to obtain and maintain synchronization and time of the day.

In one embodiment, the IEEE1588 system timing block 508 uses the clock synchronization information to create clocks and reference frequencies for the cloud 504.

In one embodiment, the IEEE1588 system timing block 508 shares time of the day information with control/management block 509 and baseband unit 505.

In one embodiment, the IEEE1588 system timing block 508 can use SYNCE or other synchronization techniques (assisted GPS, NTP, etc.) for synchronizing remote radios (remote radio 503 being one of them) and the cloud 504.

The control/management block 509 performs control and management of the baseband unit 505, IEEE1588 system timing 508, and transport unit 506.

In one embodiment, the control/management block 509 monitors the cloud 504 for any alarm or mal-function and report the collected information to higher layers.

In one embodiment the control/management 509 configures baseband unit 505 for formatting and processing the received baseband signal from RRU.

In one embodiment the control/management 509 configures baseband unit 505 for formatting and processing the transmit baseband signal sent to RRU.

In one embodiment the control/management 509 configures the specific functions that baseband unit 505 needs to perform and send a control signal to the RRU to configure RRU baseband unit to perform functions that complement the baseband functions in baseband unit 505.

In one embodiment the control/management 509 configures the specific functions that baseband unit 505 needs to perform in real time and send a control signal to the RRU to configure RRU baseband unit to perform functions that complement the baseband functions in baseband unit 505.

In one embodiment the control/management 509 configures the specific functions that baseband unit 505 needs to perform in real time based on traffic load, performance, interference, power saving, and other reasons.

In one embodiment, the control/management block 509 based on the control data received from remote radios (remote radio 503 being one of them) provides control for baseband signal streams formatting and processing in baseband unit 505.

In one embodiment, the control/management block 509 works as part of cloud RAN Self Organizing Network (SON) and carry out tasks required by SON.

Various embodiments are thus described. While particular embodiments have been described, it should be appreciated that the embodiments should not be construed as limited by such description, but rather construed according to the following claims.

The invention claimed is:

1. A cloud radio access network (CRAN) system comprising:
   a cloud with a cloud baseband unit that processes an information signal and a control signal from and to a remote radio unit (RRU), and maintains the cloud network synchronization and a time of the day using a cloud IEEE1588 (Institute of Electrical and Electronics Engineering 1588) timing protocol;
   said RRU with a RRU baseband unit that complements said cloud baseband unit and processes said information signal and said control signal from and to said cloud and a RRU IEEE1588 timing to maintain a clock synchronization with said cloud and obtain said time of the day;
   an asynchronous link between said RRU and said cloud using at least one of an Ethernet packet protocol, and a proprietary packet protocol to carry an encapsulated signal consisting of said information signal, said control signal and a synchronization signal;
   said information signal contains a baseband signal frame or packet;
   said RRU and said cloud use the time of the day and an integer number to assign a time stamp and a sequence number to said information signal, and said control signal;

said RRU in addition to the cloud's said time stamp uses said clock synchronization and said time of the day obtained from any Ethernet node in the network that supports IEEE1588 protocol to format and process the baseband frames for transmission;

said RRU and said cloud in addition to Ethernet's source and destination addresses when needed use a RRU identity code for transmitting and receiving said information signal and said control signal;

said RRU uses said time stamp and said sequence number assigned by said cloud to process and store said information signal and said control signal received from the cloud based on the order of said transmitted time stamp and said transmitted sequence number and then said RRU baseband unit formats and processes said information signal for transmission;

said cloud uses said time stamp and said sequence number assigned by said RRU to process and store said information signal and said control signal received from the RRU based on the RRU identity code and the order of said transmitted time stamp and said transmitted sequence number and then said cloud baseband unit formats and processes said information signal.

2. The cloud radio access network (CRAN) system of claim 1, wherein said information signal sent to the cloud from said RRU is a received baseband signal from said RRU's antenna.

3. The cloud radio access network (CRAN) system of claim 1, wherein said information signal sent to the RRU from said cloud is a transmit baseband signal for transmission by said RRU's antenna.

4. The cloud radio access network (CRAN) system of claim 1, wherein the RRU IEEE1588 timing uses timing information to create said clock synchronization and a reference frequency for the remote radio unit.

5. The cloud radio access network (CRAN) system of claim 1, wherein said asynchronous link between said RRU and said cloud uses header compression to save bandwidth.

6. The cloud radio access network (CRAN) system of claim 1, wherein the memory size of the RRU and the cloud supports any delay jitter of said Ethernet packets exchanged between said RRU and said cloud.

7. The cloud radio access network (CRAN) system of claim 1, wherein said control signal received by said RRU from said cloud configures the RRU baseband unit in real time to support and maintain said RRU baseband unit complement to the cloud baseband unit.

8. The cloud radio access network (CRAN) system of claim 1, wherein said control signal received by said cloud from the RRU provides a real time status of said RRU to control and support the cloud baseband unit.

* * * * *